2,938,809
Patented May 31, 1960

2,938,809
COLD WATER DISPERSIBLE LAUNDRY STARCH

Walter J. Katzbeck, Oak Park, Ill., assignor to Corn Products Company, a corporation of Delaware No Drawing. Filed June 10, 1957, Ser. No. 664,509

2 Claims. (Cl. 106—210)

This invention relates to a powdered starch concentrate which can be used in the preparation of ready-to-use laundry starches and other textile sizes.

Various preparations of starch for home laundry are available, and of particular interest are those which require no cooking prior to use. A large percentage of the ready-to-use products are the so-called "liquid" laundry starches. While these have the advantage of being easy to use, there are certain inherent disadvantages connected with their use as well as in their manufacture.

The consumer finds it inconvenient to carry home from the market a heavy bottle and a relatively large amount of water while paying a relatively high price for a product which, in comparison to a freshly prepared starching solution prepared by cooking starch in the home, has only approximately the same stiffening power. Also many of the commercially available liquid laundry starch products contain water ionizable salts. These, due to electrolytic action in contact with bimetallic elements, such as the commonly encountered Talon fasteners in clothing, cause fabric weakening and, ultimately, holes in clothing.

The manufacturer of liquid laundry starches finds the use of a nonreturnable glass container to package the product expensive, and freight costs for transporting an aqueous product except for short distances are high. Losses due to breakage are incurred during shipment and storage, especially at below freezing temperatures.

To overcome these several disadvantages and retain the desirable features of a liquid laundry starch product, an obvious improvement would be to supply the consumer with a dry, powdered product containing starch which is readily water dispersible. The consumer can shake-up such a product with water in the home and, without cooking, produce a liquid starch stock solution which is the equivalent of the precooked liquid starches she purchases on the market.

However, prior to my discovery, no known starch product has been satisfactory in all respects for such a purpose. Uncooked starches dispersed in water do not remain in suspension but pack down into a semisolid mass which is almost impossible to redisperse by shaking. Starch products which require cooking for preparation are not convenient to the consumer. Pregelatinized and dried starch products offering stiffening power equal to commercial liquid laundry starches are known but do not disperse readily in water and the product causes masking, flaking and streaking on cloth and sticking to the iron when used by the consumer. A pregelatinized, dried product, such as described under U.S. Patent 2,609,326, is freely dispersable in water, but has been converted to such an extent that it possesses a relatively low degree of stiffening power and would not form a conventional liquid laundry starch product. In any event, no starch or starch product now known is available which can be shaken with water to produce an aqueous product which is stable and has the appearance and properties of a freshly prepared starching solution which the consumer expects.

The main object of this invention is to provide a dry powdered starch concentrate which is readily dispersible in cold water and can be used to produce a liquid laundry starch stock solution which has equivalent sizing power to commercially available precooked liquid laundry starches and to freshly prepared cooked laundry starches. Other objects will appear hereinafter.

I have made the unexpected discovery that when a waxy type of starch is treated slightly with an oxidizing agent so as not to significantly reduce the stiffening power of the original starch but sufficiently to produce a product which has high clarity, and when this product is prepasted in water containing various salts or acids, such as boric acid and borax or mixtures thereof, and optionally, coloring agents, perfumes, germicidal agents, etc., and the paste is dried by conventional means to produce a flake, then the ground product is freely dispersible when shaken with water for approximately 5 seconds and it forms a full-bodied, permanent starch stock solution. This starch solution is comparable to commercial liquid laundry starches on the market in respect to stiffening power and ironing characteristics and is equivalent to freshly prepared laundry starch.

The starch should be of the waxy type, e.g., waxy grain sorghum, waxy maize, waxy rice, and the like, and the amount of oxidation is critical although various methods of oxidation of the starch may be used. The starch should be oxidized only to the extent where it has a carboxyl concentration which falls within the range of 0.025 to 0.12 percent. It will then have a Scott viscosity which falls within the range of 40 to 120 seconds per 100 ml. on the basis of 12 grams of starch cooked in 280 ml. of water for 15 minutes and within the range of 25 to 90 seconds per 100 ml. when cooked for 90 minutes. The paste obtained from the Scott viscosity determination is placed in a 13 mm. cell and cooled to 80° F. and will have a clarity expressed as percent light transmission against distilled water which falls within the range of 75 to 95 percent using 13 mm. cuvettes in a Model 14 Coleman spectrophotometer at a wavelength of 650 m$\mu$. The starch will have a Barbender hot paste viscosity which falls within the range of 50 to 350 units at a temperature of 95° C. after cooking for 60 minutes and a cold paste viscosity which falls within the range of 90 to 450 units at a temperature of 50° C. after cooling for 60 minutes when 50 grams dry substance starch is dispersed in distilled water to a volume of 500 ml.

The salts or acid aforementioned may be added before the oxidation is carried out or after the oxidation is completed and the starch washed to remove soluble materials, the starch gelatinized, dyes, germicidal agents, etc., then may be added and the resultant paste dried, as by roll or spray drying. The amount of salt or acid may range from 5 to 20 percent of the starch, dry substance. The dried product produced after grinding has a funnel dispersibility as defined later which falls within the range of 70 to 1300 seconds per 200 ml. when 10 grams of the product are dispersed in 400 ml. of water at 80° F., Brabender hydration characteristics which fall within the following ranges: peak viscosity 50 to 600 units; time to reach peak viscosity 20 to 150 seconds, and a slope value of from 1 to 45 units when 25 grams of the product are dispersed in 450 ml. of water at 80° F.

The preferred ranges within which it is desired to operate this invention, although it is understood that this invention is not limited thereby, are that the waxy type starch be oxidized to the extent where it has a carboxyl concentration which falls within the range of 0.05 to 0.12 percent. It will then have a Scott viscosity which falls within the range of 40 to 70 seconds per 100 ml. on the basis of 12 grams of starch cooked in 280 ml. of water for 15 minutes and within the range of 30 to 60 seconds per 100 ml. when cooked for 90 minutes. It will have a paste clarity after being cooled to 80° F. which falls within the range of 85 to 95 percent light transmission using 13 mm. cuvettes in a Model 14 Coleman spectrophotometer at a wavelength of 650 mμ. The starch will have a Brabender viscosity which falls within the range of 70 to 200 units at a temperature of 95° C. after cooking for 60 minutes and a cold paste viscosity which falls within the range of 110 to 250 units after holding the paste for 60 minutes at a temperature of 50° C. when 50 grams of starch dry substance is dispersed in water to a volume of 500 ml. The preferred method is to oxidize the starch in its granule state followed by washing the starch to remove soluble materials before the starch is gelatinized.

It is preferable to use the salts of boric acid and borax together, in amounts ranging from 5 to 10 percent each based on starch dry substance. These salts may be added to the starch prior to oxidation but it is preferred that they are added after the starch is washed and they are cooked together.

The paste may be roll or spray dried. It is preferable to roll dry the paste and it is preferred that the flake product produced when ground has a funnel dispersibility which falls within the range of 100 to 500 seconds per 200 ml. when 10 grams are dispersed in 400 ml. of water at 80° F. and Brabender hydration characteristics which fall within the following ranges: peak viscosity 150 to 600 units; time to reach peak viscosity 75 to 135 seconds, and a slope value of from 1 to 10 units when 25 grams are dispersed in 450 ml. of water at 80° F.

The invention will be further illustrated by the detailed examples which follow although it is to be understood the invention is not limited thereby.

EXAMPLE 1

Six moles of waxy grain sorghum starch at 10 percent moisture (1080 g.) was suspended in 1540 ml. of water. To this slurry was added 106.4 ml. of alkaline sodium hypochlorite solution whose concentration, by volume, was 9.03 percent available chlorine and 4.79 percent free sodium hydroxide. The sodium hypochlorite solution, diluted with one part of water, was added slowly to the slurry within a period of 10 minutes. The temperature of the slurry was held at 80° F. and it was agitated for a period of 16 hours at which time excess chlorine in the slurry was neutralized by the addition of approximately 0.3 gram of sodium bisulphite. The pH value of the slurry was adjusted from approximately 9.5 to 7.0 by the addition of 28 ml. of 2 N hydrochloric acid. The slurry was then dewatered on a Büchner funnel and the starch product was washed with approximately 4 liters of cold water. The starch cake was dried by conventional means to a moisture content of approximately 10 percent. Analyses of the purified, dried starch product are shown in Table I under Example 1.

Approximately 1.8 moles of the oxidized waxy grain sorghum starch product (330 grams at 10 percent moisture) was suspended in 730 ml. of warm water to 16° Bé. in which was dissolved 23.8 grams of boric acid and 14.8 grams of borax. The slurry was agitated and heated with steam in a jacketed vessel to gelatinize the starch. The paste was maintained at a temperature of 210° F. for approximately 20 minutes when heating was stopped and a solution containing a dye color and a germicidal agent was added.

The hot paste was dried on counterrotating rolls (diameter 24 inches) at a steam pressure of 95 p.s.i. and at a roll speed of 5 r.p.m. The colored flake produced was crushed, ground and screened to pass a 25-mesh screen.

The powder had the characteristics shown in Table I.

EXAMPLE 2

Example 1 was repeated except that the oxidation reaction was carried out at a temperature of 120° F. for a period of 4 hours. The starch product was purified and roll-dried, as in Example 1, except that 23.8 grams of boric acid and 19.4 grams of borax were used. Analyses of the oxidized product and of the roll-dried product are shown in Table I.

EXAMPLE 3

Example 2 was repeated except that the amount of alkaline sodium hypochlorite solution used was decreased to 74.6 ml. The purified starch product was roll-dried with the amounts of salts as shown in Example 2. Analyses of the starch product and of the roll-dried product are shown in Table I.

EXAMPLE 4

Example 2 was repeated except that the amount of alkaline sodium hypochlorite solution used was increased to 149.1 ml. The purified starch product was roll-dried with the amounts of salts as shown in Example 2. Analyses of the starch product and of the roll-dried product are shown in Table I.

EXAMPLE 5

Example 2 was repeated except that 63.1 grams of borax and 77.7 grams of boric acid were dissolved in the Table I.—Characteristics of purified, dried, alkaline sodium hypochlorite oxidized waxy grain sorghum starch products and of roll-dried products produced therefrom

| Example | Characteristics of Oxidized Starch Product | | | | | | Characteristics of Roll Dried Product | | | |
|---|---|---|---|---|---|---|---|---|---|---|
| | Scott Viscosity,[a] Cooking Time, Minutes | | Scott Paste Clarity,[b] Percent Light Transmission | Brabender Viscosity,[c] 1 Hour | | Percent COOH | Funnel Dispersibility,[d] Sec./200 ml. | Brabender Hydration Characteristics [e] | | |
| | 15 | 90 | | 95° C. | 50° C. | | | Peak Viscosity | Sec. to Peak | Slope |
| | Sec./100 ml. | | | | | | | | | |
| 1 | 52 | 47 | 94 | 300 | 350 | 0.089 | 170 | 165 | 120 | 3.3 |
| 2 | 49 | 44 | 95 | 100 | 155 | 0.092 | 330 | 210 | 75 | 6.7 |
| 3 | 120 | 86 | 75 | 350 | 450 | 0.038 | 289 | 575 | 135 | 11.5 |
| 4 | 61 | 29 | 94 | 70 | 110 | 0.119 | 250 | 50 | 90 | 1.3 |
| 5 | 87 | 41 | 84 | 120 | 140 | 0.025 | 405 | 210 | 80 | 3.5 |
| 6 | | | | | | | 480 | 190 | 90 | 5.0 |
| 7 | | | | | | | 1,300 | 50 | 20 | 1.0 |
| 8 | | | | | | | 72 | 560 | 25 | .44 |
| 9 | | | | | | | 280 | 265 | 85 | 5.3 |

[a] Concentration: 12 grams starch cooked in 280 ml. of water.
[b] In 13 mm. cuvettes using a Model 14 Spectrophotometer at a wavelength of 650 mμ against distilled water.
[c] Concentration: 50 grams starch dry substance dispersed in water to a volume of 500 ml.
[d] Concentration: 10 grams of product dispersed in 400 ml. of water at 80° F.
[e] Concentration: 25 grams of product dispersed in 450 ml. of water at 80° F.

water before the starch was added and suspended. The amount of alkaline sodium hypochlorite solution used was 53.2 ml. This reaction product was purified by filtering the slurry, washing the starch product on the filter with cold water, resuspending the filter cake in fresh water, adjusting the pH value of the slurry to 7.0 then refiltering the slurry and rewashing the cake with water. The purified starch product was roll-dried with the amounts of salts as shown in Example 2. Analyses of the starch product and of the roll-dried product are shown in Table I.

EXAMPLE 6

Example 5 was repeated except that the reaction temperature was raised to 210° F. The reaction time at this temperature was reduced to 0.25 hour. The reaction product was gelatinized and could not be purified by ordinary means, therefore, the usual analyses of the product attained at this stage in the process could not be made. The hot paste was roll-dried. The powder had the characteristics outlined in Table I and the similarity of these characteristics to those of the roll-dried products prepared in the previous examples indicated that this product was equivalent.

EXAMPLE 7

Example 2 was repeated except that 23.8 grams of boric acid and 29.7 grams of borax were used. Analyses of the roll-dried product is shown in Table I.

EXAMPLE 8

Example 2 was repeated except that 17.8 grams of boric acid and 14.8 grams of borax were used in preparing the roll-dried product. Analyses of this product is shown in Table I.

EXAMPLE 9

Example 2 was repeated except that the purified starch product slurried with the salts and the other ingredients was pumped directly to a "Votator" unit and the starch was gelatinized and cooked at a temperature ranging from 210 to 220° F. with jacket steam at a pressure ranging from 5 to 15 pounds per square inch in from 30 to 60 seconds. The paste was roll-dried directly as it issued from the "Votator" unit. Analyses of this roll-dried product are shown in Table I. A description of the "Votator" and its use is given in U.S. Patent 2,609,326 (Sept. 2, 1952).

The oxidized starch products and the cold water dispersible laundry starch products made in accordance with the present invention were evaluated both in accordance with certain standard testing and analyzing procedures, as well as by performance comparison with a commercial standard liquid laundry starch product and a commercial standard laundry starch product for cooking purposes which may be taken as representative of currently available commercial laundry starch products. The tests and factors used for evaluating the products of this invention include the following:

15 and 90 Scott viscosity determinations
Scott and paste clarity determinations
Brabender viscosity determinations
Carboxyl determination
Funnel dispersibility
Brabender hydration characteristics
Sizing and ironing evaluations Scott viscosity determinations (15 minutes) are made in accordance with the procedure outlined in Chemistry and Industry of Starch by R. W. Kerr, 2nd edition, pp. 119–121. The 90-minute Scott determinations are made accordingly, except that the time during which the paste is heated is extended from 15 minutes to 90 minutes.

Scott paste clarity determinations are made by placing the hot paste from the 15-minute Scott viscosity determination in a 13 mm. cuvette and cooling it to room temperature. This cell, and one containing distilled water, is placed in a Model 14 Coleman spectrophotometer. The instrument is adjusted to transmit monochromatic light at a wavelength of 650 m. and set at 100 percent transmission for the distilled water. The cell containing the starch paste is shifted into place. The amount of light passing through the paste is read directly from the scale of the instrument and reported as percent light transmission against distilled water.

Barbender viscosity determinations are made in accordance with the procedure outlined in Chemistry and Industry of Starch by R. W. Kerr, 2nd edition, pp. 127–130, with the modifications that 50 grams dry substance starch is dispersed in water to a volume of 500 ml. Also the heating time at a temperature of 95° C. and the holding time at a temperature of 50° C. is extended to 60 minutes.

Carboxyl determinations are made when the oxidized starch product is demineralized by steeping in a dilute solution of a mineral acid. Thereafter, the starch is freed of the acid by filtration and washing. Then, the oxidized starch containing the carboxyl group in acid form is gelatinized in hot water and titrated with standard caustic solution using phenolphthalein as an indicator.

Funnel dispersibility determinations are made according to the procedure outlined in U.S. Patent No. Re. 23,952 (Feb. 22, 1955) with the following modifications: Ten grams of the cold water dispersible starch product are dispersed in 400 ml. of water. The time required for 200 ml. of the dispersion to pass through the funnel is considered the dispersibility rating of the product.

Brabender hydration characteristics of cold water dispersible starch products are measured as follows: A 25 gram sample of the test starch product is shaken in 450 ml. of water at a temperature of 80° F. for a short time to disperse it. The dispersion is quickly transferred to the cup of a Brabender amylograph (see references above), and maintained at a temperature of 80° F. The mechanism is turned on and allowed to operate for 20 minutes. The rate and manner by which the test product absorbs water is traced as a curve by the Brabender pen on the graph paper. The height of the curve is taken as the peak viscosity of the test product. This value and the time required to reach the peak value are both recorded. The slope of the traced curve connecting the origin with the peak viscosity point is calculated and also recorded.

The following description will illustrate how the sizing and ironing characteristics of the starch products of this invention are evaluated:

Eighty grams of the roll-dried product prepared in Example 1 was shaken for approximately 5 seconds with one quart of water. The product was freely dispersible in the water and no lumps were formed. The translucent, colored liquid starch product remained stable and mold free for a period of over one month at room temperature.

An additional quantity of liquid laundry starch was prepared in the above manner and diluted with two parts of water. The resultant liquid was used to size clothing. A commercially available, well-known brand of liquid laundry starch was obtained. Following package directions, it was diluted with two parts of water and the diluted suspension was used to size clothing similar in nature to those used with the test product. The garments were then dried, sprinkled and ironed following conventional procedures.

Both sets of garments ironed with equal facility and a smooth, pliable finish was given to the clothing. No sticking to the iron or flaking or masking occurred on cloth with the use of the test starch product. The garments sized with the test product were as full-bodied as those sized with the commercial liquid laundry starch product.

The above evaluation was repeated except that in place of the commercial liquid laundry starch product used in that example, a cooked paste of a commercially available, well-known brand of laundry starch (Linit) was used. A paste of this was made by slurrying 20 grams of starch in a small quantity of water to which was then added 900 ml. of boiling water. The paste, when cool, was used to size clothing similar in nature to those used with the test product. The garments were dried, sprinkled and ironed.

Both sets of garments ironed with equal facility and a smooth, pliable finish was given to the clothing. The garments sized with the test product were as full-bodied as those sized with the cooked laundry starch product.

I claim:

1. A process for making a cold water dispersible dry laundry starch concentrate which is quickly dispersible in cold water without cooking to form a stable laundry starch preparation which comprises preparing an aqueous suspension of granules of a waxy grain starch selected from the group consisting of waxy grain sorghum starch, waxy maize starch, and waxy rice starch, adding an alkali metal hypochlorite to said suspension in an amount, based on the dry weight of said starch, equivalent to oxidize said starch to a carboxyl content of from 0.025 to 0.12 percent, heating said suspension to oxidize said starch and provide a paste having a Scott viscosity within the range of 40 to 120 seconds per 100 ml. on the basis of 12 grams of said starch cooked in 280 ml. of water for 15 minutes, neutralizing the excess chlorine in said suspension, washing said oxidized starch, gelatinizing said oxidized starch, rapidly drying said oxidized starch and grinding said dried oxidized starch, said oxidized starch being dried in admixture with 5 to 20 percent by weight, based on the dry weight of the oxidized starch, of a compound selected from the group consisting of borax, boric acid and mixtures thereof; said dried oxidized starch product having a carboxyl content of from 0.025 to 0.12 percent, a funnel dispersibility in the range of 70 to 1300 seconds per 200 ml. of 10 grams dispersed in 400 ml. of water at 80° F. and Brabender hydration characteristics in the range of peak viscosity 50 to 600 units, time to reach peak viscosity 75 to 135 seconds, and a slope value of 1 to 45 units with 25 grams dispersed in 450 ml. of water at 80° F.

2. A cold water dispersible dry laundry starch concentrate prepared according to the process of claim 1.

References Cited in the file of this patent

UNITED STATES PATENTS

| | | |
|---|---|---|
| Re. 23,952 | Kerr et al. | Feb. 22, 1955 |
| 2,348,685 | Smith et al. | May 9, 1944 |
| 2,373,016 | Daly et al. | Apr. 3, 1945 |

FOREIGN PATENTS

| | | |
|---|---|---|
| 490,070 | Great Britain | Aug. 9, 1938 |

OTHER REFERENCES

Schopmeyer et al.: "J. Ind. & Eng. Chem.," 35, pages 1168–1172 (1943).